Patented July 11, 1950

2,514,415

UNITED STATES PATENT OFFICE 2,514,415

STORAGE BATTERY PASTE WITH ION EXCHANGE EXPANDER

Carl H. Rasch, North Tonawanda, N. Y.

No Drawing. Application February 27, 1946, Serial No. 650,759

7 Claims. (Cl. 136—26)

The present invention relates to wet storage batteries of the lead-acid type and has particular reference to the negative plates of such batteries and, more especially, to the pastes employed in making up such plates.

This is a continuation in part of Serial No. 483,189, filed April 15, 1943, which became abandoned subsequent to the filing of the present application.

It has been well known in the art, for some time, that storage batteries of the type contemplated tend to fail at low temperatures. Many diverse suggestions have been made relative to the incorporation of so-called expanders into negative lead battery plates with the object in view of increasing the initial capacity under conditions of high rate and low temperature discharge and of maintaining such capacity over a longer period of useful life than that of plates not made with the addition of expanders as capacity aids.

Thus, in the prior art, it has been suggested to employ, as expanders, such unrelated materials as carbonized hemp, natural humins and lignins, sawdust, and waste sulphite liquor. Although all of these materials appear to aid the capacity to some extent, none fulfills, completely, the desired role in this connection.

It is an object of the present invention to provide a negative plate for a lead-acid storage battery which possesses an increased capacity at low temperature.

It is also an object of the invention to provide an improved composition or paste adapted to be used upon the negative plate of a lead-acid storage battery, whereby the finished battery possesses increased initial capacity under conditions of high rate and low temperature discharge.

It is also an object of the invention to provide a suitable expander which, when incorporated in the pastes employed on the negative plates of lead-acid storage batteries, will endow the resulting battery with a relatively high initial capacity at low temperature, which capacity can be maintained over relatively longer periods than is the case with plates heretofore employed.

It is also an object of the invention to provide an expander for pastes to be employed in the manufacture of negative plates of lead-acid storage batteries which results in a battery of a relatively longer useful life, during operation at low temperature, than is the case with batteries heretofore provided.

In accordance with the present invention, the negative plate of a storage battery is prepared from a paste which contains, incorporated therein, a relatively high molecular weight organic compound in finely divided condition insoluble in sulfuric acid and which is susceptible of ion exchange or which possesses an ionic affinity for anions, particularly the sulfate ion, $SO_4^=$. It is believed that when a battery is discharged, metallic lead combines with sulfate ions forming lead sulfate, thereby releasing electric energy which flows in the external battery circuit. The function of the particles of ion exchange material in the plate is to render sulfate ions quickly available for the metallic lead. It is not known just why or how the exchange compound takes on sulfate ions, but there appears to be no dispute that some sort of loose bond exists between the exchange compound and sulfate ions and that during discharge, lead sulfate is formed.

Reversal of the process and regeneration of the exchange resin occurs when, under the influence of a charging current, the lead sulfate, $PbSO_4$, is torn apart, the sulfate ions being set free and becoming available to at least in part recombine with ion exchange material.

The paste contains about 99% litharge; about 0.1 to 0.5% finely divided barium sulfate; about 0.1 to 0.5% of gas black or lamp black, and from 0.1 to 0.5% of the acid-insoluble high molecular weight expander of the present invention. The product is made into a paste by acidifying with sulfuric acid of the desired gravity, and sufficient water to make the paste workable. This paste is applied to a lead grid in the usual way and a negative plate suitable for use in the usual lead accumulator thus manufactured.

A paste which is purely illustrative of the invention, and not limitative thereof, was made from the following ingredients:

| | | |
|---|---|---|
| Litharge | pounds | 1980 |
| Finely divided barium sulfate | do | 10 |
| Lamp black | do | 4 |
| Phenylenediamine-formaldehyde resin | do | 6 |
| Sulfuric acid, 1.250 sp. gr. | gallons | 21 |
| Water, sufficient to produce paste | do | 16½ |

A battery formed with negative plate carrying the above paste showed at —10° F. a discharge time of 3.2 minutes at 300 amperes.

In lieu of the phenylenediamine-formaldehyde resin, other high molecular weight condensation products insoluble in acid, may be employed as expanders provided the compound possesses an ionic affinity for anions, particularly the sulfate ion. I have found that a large class of synthetic resins of the aminaldehyde or ketone condensation type are suitable for this purpose, particularly those prepared by the condensation of aromatic amines. Thus, benzyl aniline may be condensed with formaldehyde to produce an ion exchange resin. In like fashion, aniline itself and formaldehyde, if condensed, will form a reaction product which may be incorporated in pastes used in the manufacture of the negative plate of the usual lead storage battery.

Condensation products of aldehyde, other than formaldehyde, are also suitable in this connection and, to this end, acetaldehyde may be condensed and reacted with beta naphthyl amine.

Resins of heterocyclic origin may find employment as expanders as, for instance, the condensation product of pyrroyl and formaldehyde.

All of the above resins have anion exchange properties, i. e., an affinity for anions such as the sulfate ion, provided they are in a completely set up or advanced condition, the so-called C stage resins. The ion exchange resins should be incorporated in the pastes in the completely advanced condition and should be present in small discrete particles in order that the ion exchange characteristic be best exploited. The best type of anion exchange resins are the amine type resins already described, although other anion exchange bodies may be suitably employed.

In addition to the resinous condensation products of amines, other high molecular weight organic compounds have been found, in accordance with the present invention, suitable as expanders in lead storage battery pastes. Like the resinous condensation products, these additional materials contain amine radicals or substituted amines. Thus, certain organic dyes resulting from the condensation of amines with other organic residues appear to function in the same manner as the amine condensation resins. For instance, Erie Black when incorporated to the extent of about 1% or within the range 0.5 to 2.0% increases the discharge rate at low temperature operation of lead-acid storage batteries. This dye may be considered as a condensation product of benzidine, phenylenediamine, aniline and amidonaphthol disulfonic acid.

Dyes other than Erie Black but which like Erie Black contain the —NH$_2$ group, function in the same fashion. Cotton Yellow may be mentioned as an example of a dye of this type as well as Fast Acid Violet, the latter compound being an example of a substituted —NH$_2$ group. These dyes, like the resinous condensation products, are relatively high molecular weight compounds, are insoluble in 40% sulfuric acid and contain an amine group.

Although the exact mechanism attending the functioning of these materials in pastes for lead-acid storage batteries is not definitely known, it is believed that all of the compounds mentioned herein and of the class of condensation products of an amine and an organic compound, are capable of reacting as ion exchange materials and are thus capable of fixing anions such as $\overline{SO_4}$. That is to say, due to the capacity of the organic amine compound to combine with anions, a relatively large amount of such anion is available on the negative plate for reaction with metallic lead during the period of discharge, thus avoiding the necessity of awaiting for slow diffusion procedures to provide such $\overline{SO_4}$.

However, whatever the true mechanism and function of these high molecular weight condensation products of an amine and an organic compound may be, they all function in the same fashion, namely, to permit of higher discharge capacities at low temperature.

Although specific examples have been given of certain high molecular weight condensation products of amine and aromatic organic compounds, the present invention is not restricted to the specific examples given, but the scope of the invention is defined by the claims appended hereto.

What is claimed is:

1. For a storage battery of the lead-acid type, a plate having a paste thereon comprising an active lead compound and 0.1% to 2%, based on the weight of the paste, of an amino anion exchange body in small discrete particles and insoluble in dilute sulfuric acid as an expander.

2. For a storage battery of the lead-acid type, a plate having a paste thereon comprising an active lead compound and 0.1% to 2%, based on the weight of the paste, of an amino anion exchange body in small discrete particles and insoluble in dilute sulfuric acid as an expander, said body comprising a compound derived by condensation of an amine and an aldehyde.

3. For a storage battery of the lead-acid type, a plate having a paste thereon comprising an active lead compound and 0.1% to 2%, based on the weight of the paste, of an amino anion exchange body in small discrete particles and insoluble in dilute sulfuric acid as an expander, said body comprising a compound derived by the resinous condensation of an aromatic amino compound and an aldehyde.

4. For a storage battery of the lead-acid type, a plate having a paste thereon comprising an active lead compound and 0.1% to 2%, based on the weight of the paste, of an amino anion exchange body in small discrete particles and insoluble in dilute sulfuric acid as an expander, said body comprising a compound derived by the resinous condensation of phenylenediamine and an aldehyde as an expander.

5. For a storage battery of the lead-acid type, a plate having a paste thereon comprising an active lead compound and 0.1% to 2%, based on the weight of the paste, of an amino anion exchange body in small discrete particles insoluble in dilute sulfuric acid as an expander, said body comprising a compound derived by the resinous condensation of phenylenediamine and formaldehyde as an expander.

6. For a storage battery of the lead-acid type, a plate having a paste thereon comprising an active lead compound and 0.1% to 2%, based on the weight of the paste, of an amino anion exchange body in small discrete particles insoluble in dilute sulfuric acid as an expander, said body comprising a compound and derived by the condensation of an amino compound.

7. For a storage battery of the lead-acid type, a plate having a paste thereon comprising an active lead compound and 0.1% to 2%, based on the weight of the paste of an anion exchange resin in small discrete particles as an expander.

CARL H. RASCH.

REFERENCES CITED

The following references are of record in the file of this patent:

UNITED STATES PATENTS

| Number | Name | Date |
|---|---|---|
| 723,328 | Sperry | Mar. 24, 1903 |
| 1,581,851 | Martus | Apr. 20, 1926 |
| 2,202,489 | Hanel | May 28, 1940 |
| 2,233,281 | Brown et al. | Feb. 25, 1941 |
| 2,251,399 | Cole | Aug. 5, 1941 |

FOREIGN PATENTS

| Number | Country | Date |
|---|---|---|
| 272,550 | Great Britain | June 13, 1927 |

OTHER REFERENCES

Myers et al.; J. Ind. and Eng. Chem., vol. 33, June 1941, pages 700, 704, 706.